June 5, 1956  A. J. SYROVY ET AL  2,748,622
PLANETARY TRANSMISSION
Filed July 26, 1951
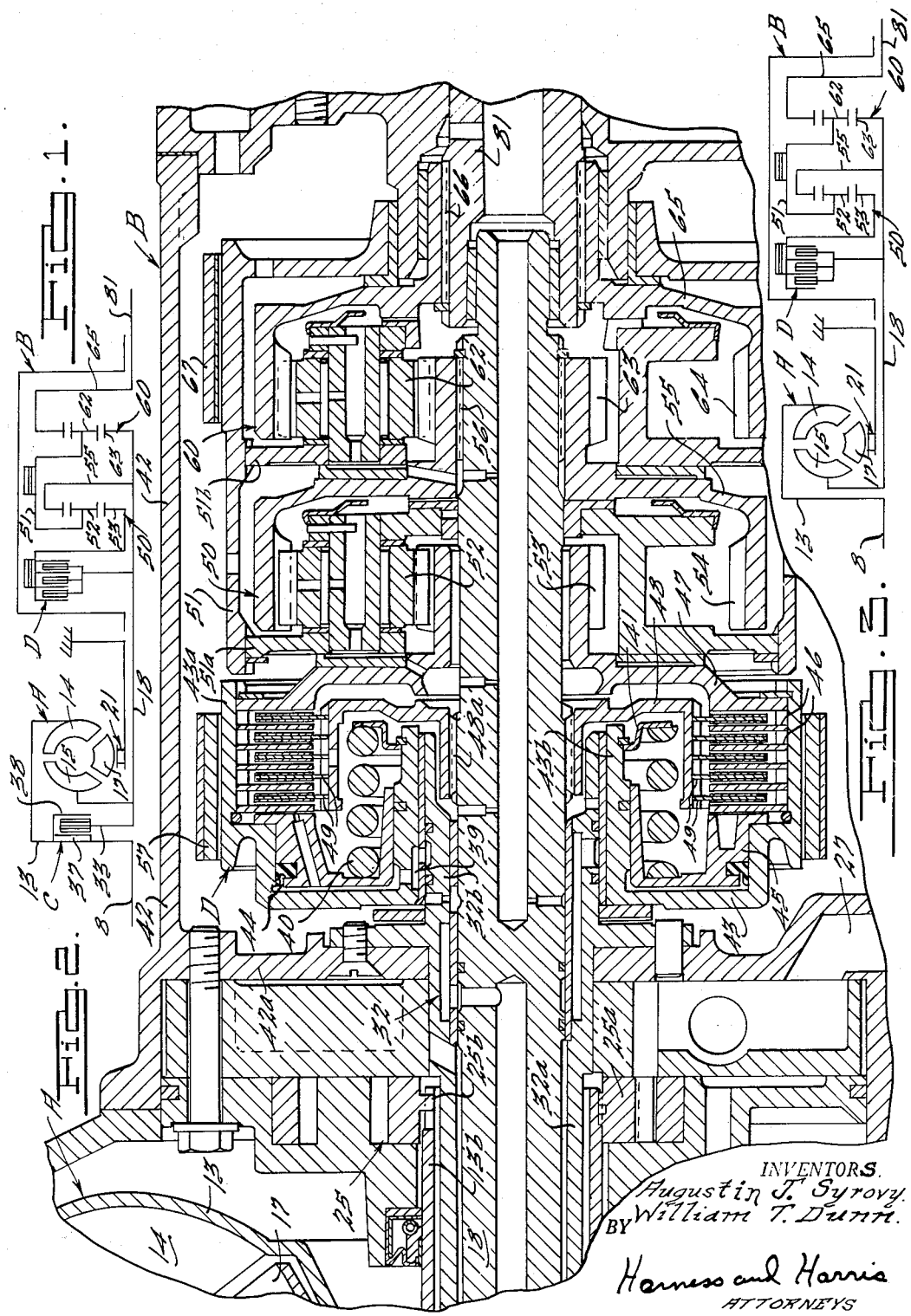
INVENTORS.
Augustin J. Syrovy.
William T. Dunn.
BY
Harness and Harris
ATTORNEYS

United States Patent Office 2,748,622
Patented June 5, 1956

2,748,622

PLANETARY TRANSMISSION

Augustin J. Syrovy and William T. Dunn, Detroit, Mich., assignors to Chrysler Corporation, Highland Park, Mich., a corporation of Delaware Application July 26, 1951, Serial No. 238,646

4 Claims. (Cl. 74—763)

This invention relates to a power transmission unit of the planetary gear type that is particularly adapted for use in motor vehicle drive trains. In particular, this invention is concerned with the specific arrangement of the forward and reverse drive planetary gear trains within the transmission gear box whereby an improved, simplified, compact, readily serviceable drive transmitting unit is provided. Furthermore, this drive unit is designed so as to be economical to manufacture and assemble in addition to being extremely durable and lending itself to ready variation of the gearing to provide different drive ratios.

It is a primary object of this invention to provide a gear box with a pair of planetary gear trains to give several forward drives and a reverse drive, the gear trains being arranged such that they may be compounded in a manner that permits utilization of a single gear train element for input to each of the gear trains and another single gear train element for output from each of the gear trains.

It is a further object of this invention to provide a pair of planetary gear trains with a single carrier element to bridgingly support the planetary pinion gears of each of the pair of gear trains.

It is still another object of this invention to provide a simplified type of forward and reverse drive planetary gear box that lends itself to drive by a hydrokinetic torque converter or the like.

It is still another object of this invention to provide a planetary gear box of simplified design that will provide all the drive ratios necessary for drive of a motor vehicle by a hydrokinetic torque transmitting unit.

Other objects and advantages of this invention will become readily apparent from a reading of the attached description and a consideration of the related drawings wherein:

Fig. 1 is a schematic diagram of a power transmission unit embodying this invention;

Fig. 2 is a sectional elevational view of a gear box utilizing the invention schematically disclosed in Fig. 1; and Fig. 3 is a schematic diagram of another power transmission unit embodying another form of this invention.

Fig. 1 of the drawings schematically discloses a power transmission unit structure that consists of a hydrokinetic torque converter device A and a change speed gear box B that are arranged in a series connected drive transmitting relationship. The reference numeral 8 represents an end portion of a driving member, such as the crankshaft of an engine of a motor vehicle power plant. The shaft 8 is drivingly connected to the casing 13 of the hydrokinetic torque converter casing A. Within converter casing 13 are mounted the various vaned converter wheel elements, namely, the impeller or pump member 14, the turbine or runner member 15, and the guide or stator member 17. The vaned impeller wheel 14 may be formed as an integral part of the converter casing 13 and is accordingly adapted to be rotatably driven by the driving shaft 8. The vaned turbine wheel 15 is drivingly connected to the forward end portion of the intermediate driven shaft member 18. The intermediate shaft member 18 is adapted to transmit drive from the turbine member 15 of the torque converter device A to the planetary gear unit B that is arranged rearwardly of and in series with the torque converter device A. The vaned guide wheel 17 is rotatably mounted within the converter casing 13 by means of the one-way brake device 21. The one-way brake 21 is arranged such that it will permit only forward rotary movement (clockwise when looking from the converter A towards the gear box B) to be transmitted to the guide wheel 17 by the forward rotation of the converter fluid by the impeller 14. Casing 13 (see Fig. 2) has a rearwardly directed, axially extending, sleeve-like flange 13b that is drivingly connected at 25b to the driving gear 25a of oil pump 25.

In order to provide means for transmitting a positive, two-way direct drive from the driving shaft 8 to the intermediate shaft 18 a torque converter lock-up clutch C (see Fig. 1) is provided. The lock-up clutch C is mounted within the torque converter casing 13 and includes the radially extending drive transmitting disc 33 that has friction elements mounted on its side faces adjacent its periphery. Drive transmitting disc 33 is drivingly connected to the intermediate shaft 18. The forward portion of the torque converter casing 13 provides the input or driving side of the converter lock-up clutch C. Converter casing 13 at its forward portion is provided with an axially shiftable, hydraulically actuated, piston 37. Converter casing 13 also supports a clutch backing plate 38 that is arranged to cooperate with the piston 37 so as to provide means to clampingly engage the friction faces of clutch disc 33 when pressure fluid is applied to the piston 37.

The gear box B (see Figs. 1 and 2) that involves the invention herein described and claimed includes the direct drive clutch D and the pair of planetary gear trains 50 and 60 that are adapted to cooperate with the torque converter device A to provide means for the transmission of torque multiplying forward and reverse drives between the axially aligned, interengaged, relatively rotatable, input and output shafts 18, 81 respectively. Gear box B carries the sleeve plate 32, that is detachably mounted on the forward wall 42a of the gear box housing 42. Sleeve plate 32 includes a forwardly directed, axially extending, sleeve-like flange 32a that supports the stator one-way brake device 21. Plate 32 also includes a rearwardly directed, axially extending, annular flange 32b that rotatably supports the drum element 43 of the direct drive clutch D. Drum element 43 has an outer peripheral, axially extending, surface 43a that is adapted to be engaged by the brake band 57 to anchor the drum 43 against rotation. Drum 43 is shaped so as to provide an axially extending piston receiving bore 44. Within bore 44 is reciprocably mounted a piston 45. The drum peripheral portion 43a has drivingly connected thereto a plurality of radially extending, axially shiftable, clutch plates 46 and a backing plate 47. The drum 43 and its plates 46 and 47 normally constitute the driven side of the direct drive clutch D. The driving side of clutch D is composed of the spider element 48 that is splined at 48a to the intermediate shaft 18. Spider element 48 has a group of radially extending, axially shiftable, clutch plates 49 drivingly connected thereto and arranged so as to extend between the aforementioned clutch plates 46. An axially extending spring 40, that is concentrically arranged about the sleeve plate portion 32b, is positioned to extend between the piston 45 and a radially extending, annular anchor ring 41 that is fixed to the inwardly disposed, axially extending portion 43b of the drum 43. Spring 40 continuously urges the piston 45 forwardly to a clutch disengaged position.

On admission of pressure fluid to bore 44 through inlet channel 39, the piston 45 will be forced rearwardly to clampingly engage the clutch plates 46, 49 between the piston 45 and backing plate 47. On release of the pressure fluid from bore 44, the piston 45 will be moved forwardly by spring 40 to its clutch disengaged position.

The forwardly positioned planetary gear train 50 that is adapted to be activated to provide means for transmitting a torque multiplying forward underdrive ratio through this power transmission unit gear box B includes the drum-like planet pinion carrier 51. Carrier 51 has a forward wall portion 51a that rotatably supports a plurality (only one shown) of planet pinion gears 52. A sun gear element 53 is arranged in meshing engagement with the planet pinions 52. Sun gear element 53 is carried by the backing plate member 47 of the direct drive clutch D. Accordingly, drive may be transmitted from the converter driven shaft 18 through spider 48, clutch plates 46, 49 and backing plate 47 to sun gear 53 whenever clutch D is engaged. The planet pinions 52 of gear train 50 are also in meshing engagement with the annulus gear 54 that is carried by a spider element 55. Spider element 55 is drivingly connected to the intermediate shaft 18 by the splines 56. The brake band 57, that was previously mentioned in the description of the clutch D, is adapted to be applied to drum element 43a of clutch D to anchor the sun gear 53 of planetary 50 against rotation. Band 57 is applied to drum 43 by means of a servo mechanism not shown. Application of band 57 to drum 43 activates planetary gear train 50 for the transmission of a forward underdrive ratio from input shaft 18 to output shaft 81. The transmission of the forward underdrive ratio is through planetary gear trains 50 and 60 which function in a compounded relationship. The means for the transmission of this compounded forward underdrive ratio will become more apparent after reading the description of reverse drive planetary gear train 60.

Rearwardly positioned, reverse drive planetary gear train 60 includes the planet pinion carrier plate 51b that is supported by the aforementioned drum-like carrier member 51. Rotatably mounted on the pinion carrier plate 51b are a plurality (only one shown) of planet pinion gears 62. Planet pinion gears 62 are arranged in meshing engagement with the sun gear element 63. Sun gear 63 is drivingly connected at 56 to the converter driven intermediate shaft 18. In the construction disclosed, it will be noted that the sun gear 63 of the rear planetary gear train 60 is integral with the annulus gear 54 of the forwardly positioned planetary gear train 50 and each of these input gears are drivingly connected to the shaft 18. Meshing with and surrounding the planet pinion gears 62 is an annulus gear 64. Annulus gear 64 has its supporting spider element 65 drivingly connected by splines 66 to the gear box output shaft 81. A brake band 67, that encircles the rear end portion of the outer periphery of drum-like carrier member 51, is arranged to be engaged with carrier 51 to anchor the carrier 51 against rotation. Band 67 is applied to carrier 51 by means of a servo mechanism not shown. Application of band 67 to carrier 51, while direct drive clutch D is disengaged, will activate the rear planetary gear train 60 from the transmission of a reverse drive from intermediate shaft 18 through sun and planet gears 63, 62 respectively, to the annulus gear 64 which latter gear is drivingly connected to the output shaft 81. A control system for the power transmission unit herein described is set forth in the copending application of Paul C. Ackerman, Serial No. 150,490 filed March 18, 1950.

It will be noted that the gear box B has the planetary gear trains 50, 60 arranged such that the box is quite advantageous from economic as well as operational and production standpoints. First, the input to either the forward or reverse underdrive ratio gear trains 50, 60 respectively, is from the same gear train element, namely the intermediate shaft driven sun gear 63 and its integral annulus gear flange 55. This results from the fact that the sun gear element 63 is integrally formed with the annulus gear 54. Second the output from either of the gear trains 50, 60 to the output shaft 81 is through the same gear train element, namely the annulus gear 64. This results from the fact that the gear train 50 is compounded with the gear train 60 for the forward underdrive ratio whereas the gear train 60 operates singly for the transmission of the reverse drive and in either case annulus 64 is the final driven gear train element. Third, a single pinion gear carrier drum 51 is utilized to bridgingly connect and support the pair of planet pinion gear carrier plates 51a, 51b. Fourth, the gearing arrangement is such that the same size, similar gears 52, 62 are used as pinion gears in each of the two gear trains 50, 60. This permits the use of identical gear blanks for fabricating the two sets of pinion gears 52, 62 and this is quite advantageous from a manufacturing and assembly standpoint. Furthermore, the symmetrical arrangement of gears 52, 62 in the gear box B is advantageous from an assembly and operational standpoint. When using pinion gears 52, 62 of sixteen (16) teeth each, the sun gears 53, 63 may each have twenty (20) teeth each and the annulus gears 54, 64 may each have fifty-two (52) teeth each. This similarity in the gearing of the two gear trains is particularly advantageous from a manufacturing standpoint. The aforedescribed gear trains will provide a compounded forward drive ratio of 1.62 and a reverse drive ratio of 2.6. Utilization of these ratios with a torque converter having a torque multiplication factor of about 2.6 has been found to provide a power transmission unit that is particularly adapted for current motor vehicle drive. It is thought to be obvious that other tooth relationships may be used to secure different drive ratios while still maintaining the symmetrical gearing arrangement herein disclosed.

The schematic power transmission unit shown in Fig. 3 is similar to the Fig. 1 disclosure but differs therefrom in that the torque converter A does not include the converter lock-up clutch mechanism C. It is obvious that different types of converters or fluid couplings or clutches of any sort can be utilized with the gear box B that embodies this invention. The arrangement shown in Fig. 3 transmits all drive through the fluid of the torque converter. Accordingly coast drive braking may not be as effective as with the Fig. 1 construction. However, the Fig. 3 unit would be less expensive to produce and it might be better adapted for the lower priced motor vehicles. As far as economy is concerned the converter lock-up clutch C of the Fig. 1 unit will eliminate the inherent slip of the converter A during direct drive so there are advantages obtained with the Fig. 1 unit that are not included in the Fig. 3 unit. As for accelerating power, each of the disclosed units offers the same and this is due to the novel gear box design comprising this invention that is common to both the Fig. 1 and Fig. 3 units.

We claim:

1. A power transmission unit comprising a housing rotatably mounting aligned input and output shafts, a clutch means mounted concentrically about said input shaft comprising a first clutch member having one end journaled on said gear box housing, a second clutch member drivingly connected to said input shaft and having portions thereof selectively engageable with said first clutch member for the transmission of drive therebetween, means to effect engagement of said first and second clutch members, first and second series arranged planetary gear trains mounted concentrically about said input shaft in axially spaced relationship, said first gear train comprising a first sun gear surrounding said input shaft and mounted on and drivingly connected to the other end of the first housing supported clutch member, an axially extending drum-like planet pinion carrier concentrically surrounding said input shaft and said first sun gear, said carrier having a first inwardly directed, radially extending wall portion journaled on said other end of the first housing supported clutch member and rotatably supporting a first set of planet pinion gearing that meshingly engages with said first sun gear, a first annulus gear arranged concentrically within said carrier and meshingly engaged with said first set of planet pinion gearing, said first annulus gear having a first portion drivingly connected to said input shaft and a second portion providing a second sun gear that surrounds said input shaft at a location spaced axially of the input shaft from said first sun gear, a second inwardly directed, radially extending wall portion of said drum-like planet pinion carrier rotatably supporting a second net of planet pinion gearing that meshingly engages said second sun gear, a second annulus gear arranged concentrically within said carrier and surrounding and meshingly engaging said second set of planet pinion gearing and having portions thereof drivingly connected to said output shaft, a third inwardly directed, radially extending wall portion of said drum-like planet pinion carrier rotatably mounted on said gear box housing, a first brake means selectively engageable with said housing supported first sun gear and a second brake means selectively engageable with said housing supported planet pinion carrier case.

2. A power transmission unit comprising a hydrokinetic torque transmitting device including relatively rotatable driving and driven vaned wheels, a gear box arranged in series with said hydrokinetic torque transmitting device comprising a housing rotatably mounting axially aligned input and output shafts, said input shaft being drivingly connected to the driven wheel of the hydrokinetic torque transmitting device, a clutch means mounted concentrically about said input shaft comprising a first clutch member having one end journaled on said gear box housing, a second clutch member drivingly connected to said input shaft and having portions thereof selectively engageable with said first clutch member for the transmission of drive therebetween, means to effect engagement of said first and second clutch members, first and second series arranged planetary gear trains mounted concentrically about said input shaft in axially spaced relationship, said first gear train comprising a first sun gear surrounding said input shaft and mounted on and drivingly connected to the other end of the first housing supported clutch member, an axially extending drum-like planet pinion carrier concentrically surrounding said input shaft and said first sun gear, said carrier having a first inwardly directed, radially extending wall portion journaled on said other end of the first housing supported clutch member and rotatably supporting a first set of planet pinion gearing that meshingly engages said first sun gear, a first annulus gear arranged concentrically within said carrier and meshingly engaged with said first set of planet pinion gearing, said first annulus gear having a first portion drivingly connected to said input shaft and a second portion providing a second sun gear that surrounds said input shaft at a location spaced axially of the input shaft from said first sun gear, a second inwardly directed, radially extending wall portion of said drum-like planet pinion carrier rotatably supporting a second set of planet pinion gearing that meshingly engages said second sun gear, a second annulus gear arranged concentrically within said carrier and surrounding and meshingly engaging said second set of planet pinion gearing and having portions thereof drivingly connected to said output shaft, a third inwardly directed, radially extending wall portion of said drum-like planet pinion carrier rotatably mounted on said gear box housing, a first brake means selectively engageable with said housing supported first sun gear and a second brake means selectively engageable with said housing supported planet pinion carrier case.

3. A power transmission unit comprising a hydrokinetic torque transmitting device including relatively rotatable driving and driven vaned wheels and a first clutch means associated therewith adapted to be engaged to positively connect said driving and driven wheels, a gear box arranged in series with said hydrokinetic torque transmitting device comprising a housing rotatably mounting axially aligned input and output shafts, said input shaft being drivingly connected to the driven wheel of the hydrokinetic torque transmitting device, a second cluch means mounted concentrically about said input shaft comprising a first clutch member having one end journaled on said gear box housing, a second clutch member drivingly connected to said input shaft and having portions thereof selectively engageable with said first clutch member for the transmission of drive therebetween, means to effect engagement of said first and second clutch means, first and second series arranged planetary gear trains mounted concentrically about said input shaft in axially spaced relationship, said first gear train comprising a first sun gear surrounding said input shaft and mounted on and drivingly connected to the other end of the first housing supported clutch member of said second clutch means, an axially extending drum-like planet pinion carrier concentrically surrounding said input shaft and said first sun gear, said carrier having a first inwardly directed, radially extending wall portion journaled on said other end of the first housing supported clutch member of said second clutch means and rotatably supporting a first set of planet pinion gearing that meshingly engages said first sun gear, a first annulus gear arranged concentrically within said carrier and meshingly engaged with said first set of planet pinion gearing, said first annulus gear having a first portion drivingly connected to said input shaft and a second portion providing a second sun gear that surrounds said input shaft at a location spaced axially of the input shaft from said first sun gear, a second inwardly directed, radially extending wall portion of said drum-like planet pinion carrier rotatably supporting a second set of planet pinion gearing that meshingly engages said second sun gear, a second annulus gear arranged concentrically within said carrier and surrounding and meshingly engaging said second set of planet pinion gearing and having portions thereof drivingly connected to said output shaft, a third inwardly directed, radially extending wall portion of said drum-like planet pinion carrier rotatably mounted on said gear box housing, a first brake means selectively engageable with said housing supported first sun gear and a second brake means selectively engageable with said housing supported planet pinion carrier case.

4. A power transmission unit comprising a housing rotatably mounting axially aligned input and output shafts, a clutch means mounted concentrically about said input shaft comprising a first friction clutch member having one end journaled on said gear box housing, a second friction clutch member drivingly connected to said input shaft and having portions thereof selectively engageable with said first clutch member for the transmission of drive therebetween, means to effect engagement of said first and second clutch members, first and second series arranged, simple, planetary gear trains mounted concentrically about said input shaft in axially spaced relationship, said first gear train comprising a first sun gear surrounding said input shaft and mounted on and drivingly connected to the other end, of the first housing supported clutch member, an axially extending drum-like planet pinion carrier concentrically surrounding said input shaft and said first sun gear, said carrier having a first inwardly directed, radially extending wall portion journaled on said other end of the housing supported clutch member and rotatably supporting a first set of planet pinion gearing that meshingly engages said first sun gear, a first annulus gear arranged concentrically within said carrier and meshingly engaged with said first set of planet pinion gearing and drivingly connected to said input shaft, a second sun gear surrounding said input shaft and drivingly connected thereto at a location spaced axially of the input shaft from said first sun gear, a second inwardly directed, radially extending wall portion of said drum-like planet pinion carrier rotatably supporting a second set of planet pinion gearing that meshingly engages said second sun gear, a second annulus gear arranged concentrically within said carrier and surrounding and meshingly engaging said second set of planet pinion gearing and having portions thereof drivingly connected to said output shaft, a third inwardly directed, radially extending wall portion of said drum-like planet pinion carrier rotatably mounted on said gear box housing, a first brake means selectively engageable with said housing supported first sun gear and a second brake means selectively engageable with said housing supported planet pinion carrier case.

References Cited in the file of this patent

UNITED STATES PATENTS

| | | |
|---|---|---|
| 752,953 | Brush | Feb. 23, 1904 |
| 2,088,782 | Ford | Aug. 3, 1937 |
| 2,176,138 | Kelley | Oct. 17, 1939 |
| 2,368,684 | Simpson | Feb. 6, 1945 |
| 2,551,746 | Iavelli | May 8, 1951 |
| 2,558,738 | Davis et al. | July 3, 1951 |
| 2,694,948 | McFarland | Nov. 23, 1954 |

OTHER REFERENCES

Publication: Product Engineering, pages 94–97, January 1950.